(12) United States Patent
Gong et al.

(10) Patent No.: US 9,084,156 B2
(45) Date of Patent: Jul. 14, 2015

(54) METHOD, SYSTEM, AND APPARATUS FOR RESERVING NETWORK RESOURCES

(75) Inventors: Xiaoyu Gong, Shenzhen (CN); Hongguang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 577 days.

(21) Appl. No.: 13/039,810

(22) Filed: Mar. 3, 2011

(65) Prior Publication Data

US 2011/0173330 A1   Jul. 14, 2011

Related U.S. Application Data

(63) Continuation of application No. PCT/CN2009/073540, filed on Aug. 26, 2009.

(30) Foreign Application Priority Data

Sep. 4, 2008  (CN) .......................... 2008 1 0216055

(51) Int. Cl.
  *G06F 15/173*   (2006.01)
  *H04W 28/26*   (2009.01)
  *H04L 12/24*   (2006.01)
  *H04W 36/00*   (2009.01)

(52) U.S. Cl.
  CPC .............. *H04W 28/26* (2013.01); *H04L 41/50* (2013.01); *H04W 36/00* (2013.01)

(58) Field of Classification Search
  USPC ......................................................... 709/226
  See application file for complete search history.

(56) References Cited

U.S. PATENT DOCUMENTS

| | | | |
|---|---|---|---|
| 6,985,951 B2 * | 1/2006 | Kubala et al. ................. | 709/226 |
| 7,089,558 B2 * | 8/2006 | Baskey et al. ................. | 718/104 |
| 7,161,914 B2 * | 1/2007 | Shoaib et al. ................. | 370/331 |
| 7,647,406 B2 * | 1/2010 | Liu .............................. | 709/226 |
| 7,773,563 B2 * | 8/2010 | Lee et al. ...................... | 370/331 |
| 7,889,648 B2 * | 2/2011 | Zheng .......................... | 370/230 |

(Continued)

FOREIGN PATENT DOCUMENTS

| | | |
|---|---|---|
| CN | 1832448 A | 9/2006 |
| CN | 101179839 A | 5/2008 |

(Continued)

OTHER PUBLICATIONS

Huawei Technologies Co., Ltd, Traffic management of IPTV multicast services, International Telecommunication Standatization Sector, Focus Group on IPTV, FG IPTV-C-0123, Oct. 16-20, 2006, pp. 2-4.*

(Continued)

*Primary Examiner* — Hua Fan
(74) *Attorney, Agent, or Firm* — Brinks Gilson & Lione (57) ABSTRACT

The present invention discloses a method, a system and an apparatus for reserving network resources. The network resource reservation method includes: directly receiving, from a mobility management control function (MMCF), a request for resource reservation on a target transport path; controlling a transport function to reserve network resources on the target transport path according to the resource reservation request; and returning a result of the network resource reservation to the MMCF. The technical solution of the present invention enables advance resource reservation on a target transport path before a network handover occurs, when a user is moving.

7 Claims, 6 Drawing Sheets

(56) References Cited

U.S. PATENT DOCUMENTS

| | | | | |
|---|---|---|---|---|
| 7,953,026 | B2* | 5/2011 | Boudreau et al. | 370/255 |
| 7,969,931 | B2* | 6/2011 | Bachmann et al. | 370/328 |
| 8,134,975 | B2* | 3/2012 | Bachmann et al. | 370/331 |
| 8,145,210 | B2* | 3/2012 | Thalanany et al. | 455/432.1 |
| 8,165,070 | B2* | 4/2012 | Salminen | 370/329 |
| 8,233,441 | B2* | 7/2012 | Bachmann et al. | 370/328 |
| 2003/0193910 | A1* | 10/2003 | Shoaib et al. | 370/331 |
| 2007/0008929 | A1* | 1/2007 | Lee et al. | 370/331 |
| 2007/0025297 | A1* | 2/2007 | Lee et al. | 370/331 |
| 2007/0211638 | A1 | 9/2007 | Lee et al. | |
| 2007/0248106 | A1 | 10/2007 | Liu | |
| 2008/0095114 | A1* | 4/2008 | Dutta et al. | 370/331 |
| 2008/0095119 | A1* | 4/2008 | Bachmann et al. | 370/332 |
| 2008/0140842 | A1 | 6/2008 | Kwang-Il et al. | |
| 2008/0159232 | A1* | 7/2008 | Thalanany et al. | 370/332 |
| 2008/0256237 | A1* | 10/2008 | Liu | 709/226 |
| 2008/0304454 | A1* | 12/2008 | Zhong et al. | 370/331 |
| 2009/0052398 | A1* | 2/2009 | Hofmann | 370/331 |
| 2009/0168726 | A1* | 7/2009 | Thalanany et al. | 370/332 |
| 2010/0180111 | A1* | 7/2010 | Hahn et al. | 713/150 |
| 2010/0333171 | A1* | 12/2010 | You et al. | 726/1 |
| 2011/0217981 | A1* | 9/2011 | Bachmann et al. | 455/436 |
| 2012/0096520 | A1* | 4/2012 | Dutta et al. | 726/4 |

FOREIGN PATENT DOCUMENTS

| | | |
|---|---|---|
| EP | 1347614 A2 | 9/2003 |
| KR | 20070091067 A | 9/2007 |
| KR | 100814101 B1 | 3/2008 |
| WO | WO 2010/025654 A1 | 3/2010 |

OTHER PUBLICATIONS

ITU-T Q.1707/Y.2804, Generic framework of mobility management for next generation networks, Feb. 2008, sections 7.4 & 8.4.1.*

ITU-T Q.1707/Y.2804 "Generic framework of mobility management for next generation networks" International Telecommunication Union, Feb. 2008.

ITU TD 432 Rev.2 (WP 2/13), TD 591 Rev.2 (GEN/19) "Mobility Control Functions in the NGN" International Telecommunication Union, Jan. 2008.

ITU FG IPTV-C-0123 "Traffic Management of IPTV multicast services" International Telecommunication Union, Oct. 2006.

International Search Report for International Application No. PCT/CN2009/073540, mailed Nov. 12, 2009 Huawei Technologies C., Ltd.

First Office Action of related Chinese Application No. 200810216055.0 mailed Apr. 26, 2011.

Second Office Action of related Chinese Application No. 200810216055.0 dated Oct. 8, 2011.

ITU-T Y. 2111 dated Sep. 2006, pp. 6-31.

ITU-T Q. 1707/Y. 2804 dated Feb. 2008, pp. 7-19.

Extended EU Search Report issued in related EP 09811029.9 dated Oct. 27, 2011.

Generic framework of mobility management for next generation networks, ITU-T, Q.1707/Y.2804, Telecommunication Standardization Sector of ITU, dated Feb. 2008.

Output—Draft Recommendation Y.RACF (Y.2111) Release 2 (Version 0.5.0), International Telecommunication Union, Telecommunication Standardization Sector, TD 242 Rev.1(WP 4/13), dated Jan. 14-25, 2008.

Kim, "QoS-aware Seamless Handover Schemes between Heterogeneous Networks in NGN," Advanced Communication Technology, 2010 the 12th International Conf. on IEEE, Feb. 7, 2010, pp. 184-189.

You, ZTE Corp., "Proposal for the interface between RACF and MMCF: C 788," ITU-T Drafts, International Tele. Unit., Geneva; CH vol. Study Group, 13, 4/13, pp. 1-4, XP017444437, dated Sep. 12, 2010.

Written Opinion of the International Searching Authority issued in related PCT/CN2009/073540 dated Nov. 12, 2009.

Office Action issued in corresponding Korean Patent Application No. 10-2011-7006077, mailed Jan. 30, 2013.

Office Action issued in corresponding Korean Patent Application No. 10-2011-7006077, mailed Jul. 24, 2012.

Chinese Patent No. 101668317 issued on Jul. 11, 2012, granted in corresponding Chinese patent application 200810216055.0.

* cited by examiner

METHOD, SYSTEM, AND APPARATUS FOR RESERVING NETWORK RESOURCES

CROSS-REFERENCE TO RELATED APPLICATIONS

This application is a continuation of International Application No. PCT/CN2009/073540, filed on Aug. 26, 2009, which claims priority to Chinese Patent Application No. 200810216055.0, filed on Sep. 4, 2008, both of which are hereby incorporated by reference in their entireties

FIELD OF THE INVENTION

The present invention relates to the communications field, and in particular, to a method, a system and an apparatus for reserving network resources.

BACKGROUND OF THE INVENTION

An important challenge to future communications is to realize seamless handover of multimedia services in fixed and mobile networks so that users can enjoy uninterrupted services anywhere at any time. When a user or a user equipment (UE) moves in the transport path of different networks, to bring better service experience to the user, a fast and short-delay seamless handover is required.

In a network resource reservation solution in the prior art, a method based on a centralized resource and admission control system can provide the network resource reservation service to reserve network resources for a user according to the resource status of the current network and the service policy of the user.

Figure 1:
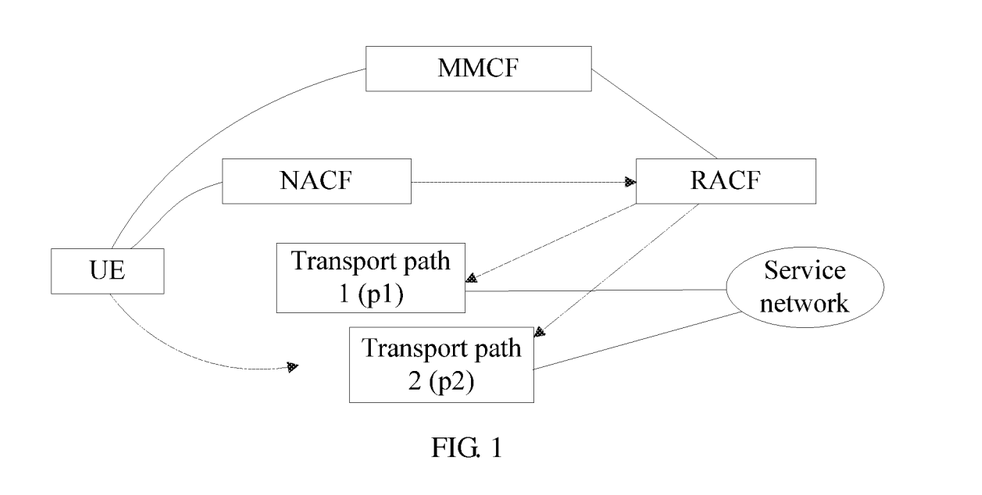
FIG. 1 is a schematic diagram illustrating a structure of an overall technical solution of the embodiments of the present invention.

As shown in FIG. 1, in a resource and admission control function (RACF), a policy decision function entity (PD-FE) receives a resource request from a service control function (SCF) and makes a comprehensive decision according to the service request, network policy and the transport subscription information of the user, and requests a transport resource control function entity (TRC-FE) and a policy enforcement function entity (PE-FE) to assign access and core transport resources, thus realizing resource reservation.

As seen from above, the prior art has the following drawback:

The above network resource reservation solution based on a centralized resource and admission control system can only reserve network resources with respect to the current path of the user. The RACF controls the resource assignment for user sessions. At one moment, with respect to the current user, the RACF has only one resource reservation record.

The solution in the prior art is unable to reserve network resources in advance on the possible target transport path before a network handover actually occurs, when a UE is moving. The solution can only release network resources on the transport path before the handover and then reserve network resources on the target transport path for the user after the path handover actually occurs. The handover causes a long delay and as a result, the quality of the ongoing service of the user drops and the service is even interrupted.

SUMMARY OF THE INVENTION

The purpose of the embodiments of the present invention is to realize advance reservation of network resources on the target transport path while retaining the network resources on the current path of a UE before a network handover actually occurs, when the UE is moving.

For the above purpose, the embodiments of the present invention provide a method, a system and an apparatus for reserving network resources so as to realize advance network resource reservation on the target transport path.

Specifically, an embodiment of the present invention provides a network resource reservation method, including:

directly receiving, from a mobility management control function (MMCF), a request for resource reservation on a target transport path;

controlling a transport function to reserve network resources on the target transport path according to the resource reservation request; and returning a result of the network resource reservation to the MMCF.

An embodiment of the present invention provides a network resource reservation system, including an MMCF, an RACF and a transport function, where:

the MMCF is configured to: send a request for resource reservation on a target transport path to the RACF, receive a network resource reservation result returned by the RACF, and notify a UE of the resource reservation result;

the RACF is configured to: receive the resource reservation request, control the transport function to reserve network resources on the target transport path, and return the network resource reservation result to the MMCF through an external interface; and the transport function is configured to reserve network resources on the target transport path according to the control of the RACF.

An embodiment of the present invention provides a network apparatus, including:

a receiving unit, configured to directly receive, from an MMCF, a request for resource reservation on a target transport path;

a controlling unit, configured to control a transport function to reserve network resources on the target transport path according to the resource reservation request; and a feedback unit, configured to return a result of the network resource reservation to the MMCF.

Thus, the embodiments of the present invention realize advance resource reservation on a new target transport path through collaboration of the MMCF and the RACF before a network handover when the UE is moving. In addition to the current transport path of the user, resources can be reserved in advance on the target transport path. Once the user keeps moving and a handover occurs, the UE can quickly and smoothly be handed over to the target transport path.

BRIEF DESCRIPTION OF THE DRAWINGS

The accompanying drawings are intended for better understanding of the present invention and constitute part of this application rather than limitation of the present invention. In the accompanying drawings.

DETAILED DESCRIPTION OF THE EMBODIMENTS

To make the technical solution and merits of the present invention clearer, a detailed description of the embodiments of the present invention is hereinafter given with reference to accompanying drawings. The exemplary embodiments of the present invention and description thereof are intended for interpreting rather than limiting the present invention.

In the embodiments of the present invention, an RACF includes a new external interface for direct communications with an MMCF. When a user or a UE moves, for example, the current transport path of the UE is transport path 1 (p1) and the UE moves toward transport path 2 (p2), the MMCF and the RACF can cooperate to reserve network resources on p2, the possible handover target of the UE, according to the user information pushed by a Network Attachment Control Function (NACF). The network resources are primarily the bandwidth required by a session of the UE. The transport path p1 where the UE is located before a handover occurs and when the UE moves in a network is described as the current transport path. The UE may move toward either p2 or p3 in a new network. The two new paths are described as candidate transport paths. The path that the network or UE finally determines that the UE will move to is the target transport path.

The MMCF is a function entity that manages and controls the UE. The MMCF may be a standalone function module or be integrated in the UE or other network devices.

Figure 2:
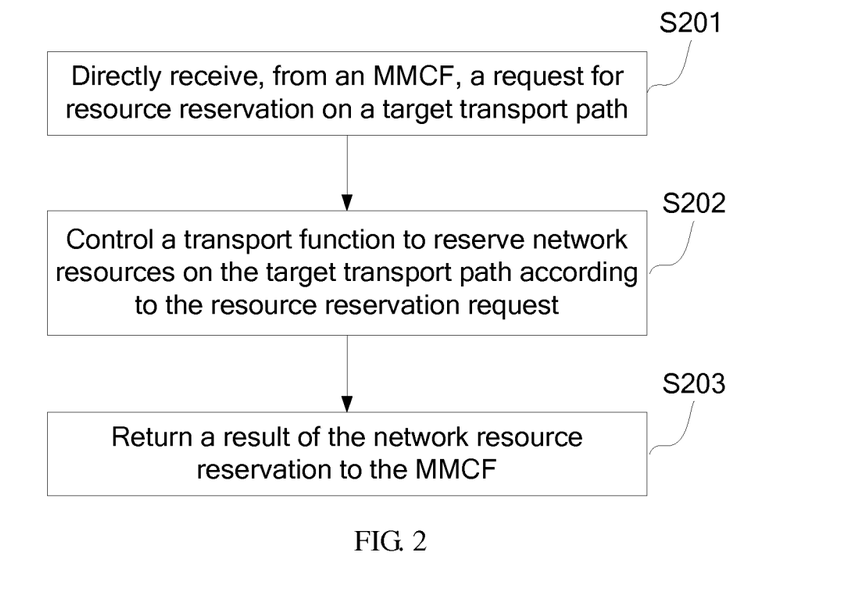
FIG. 2 is a flowchart of a network resource reservation method according to an embodiment of the present invention.

A first embodiment of the present invention provides a network resource reservation method, as shown in FIG. 2. The method includes the following steps:

S201. Directly receive, from the MMCF, a request for resource reservation on the target transport path.

S202. Control a transport function to reserve network resources on the target transport path according to the resource reservation request.

S203. Return the result of network resource reservation to the MMCF.

In an embodiment of the present invention, step S201 includes: directly receiving, from the MMCF, a request for resource reservation on the target transport path, through an external interface which enables direct communications between the RACF and the MMCF.

In an embodiment of the present invention, before step S201, the NACF pushes the user ID of the UE, location information of the target transport path, and the user transport configuration of the UE to the RACF, and in step S201, the RACF makes a decision according to the user ID of the UE, location information of the target transport path, and user transport configuration of the UE, and the user ID of the UE and location information of the target transport path pushed by the MMCF and controls the transport function to reserve network resources.

Thus, the embodiments of the present invention realize advance resource reservation on a new target transport path through the collaboration of the MMCF and the RACF. In addition to the current transport path of the user, resources can be reserved in advance on the target transport path. Once the user keeps moving and a handover occurs, the user can quickly and smoothly be handed over to the target transport path.

The MMCF can obtain the result of network resource reservation on the target transport path. The network resource reservation is implemented through a transport stratum.

Figure 5:
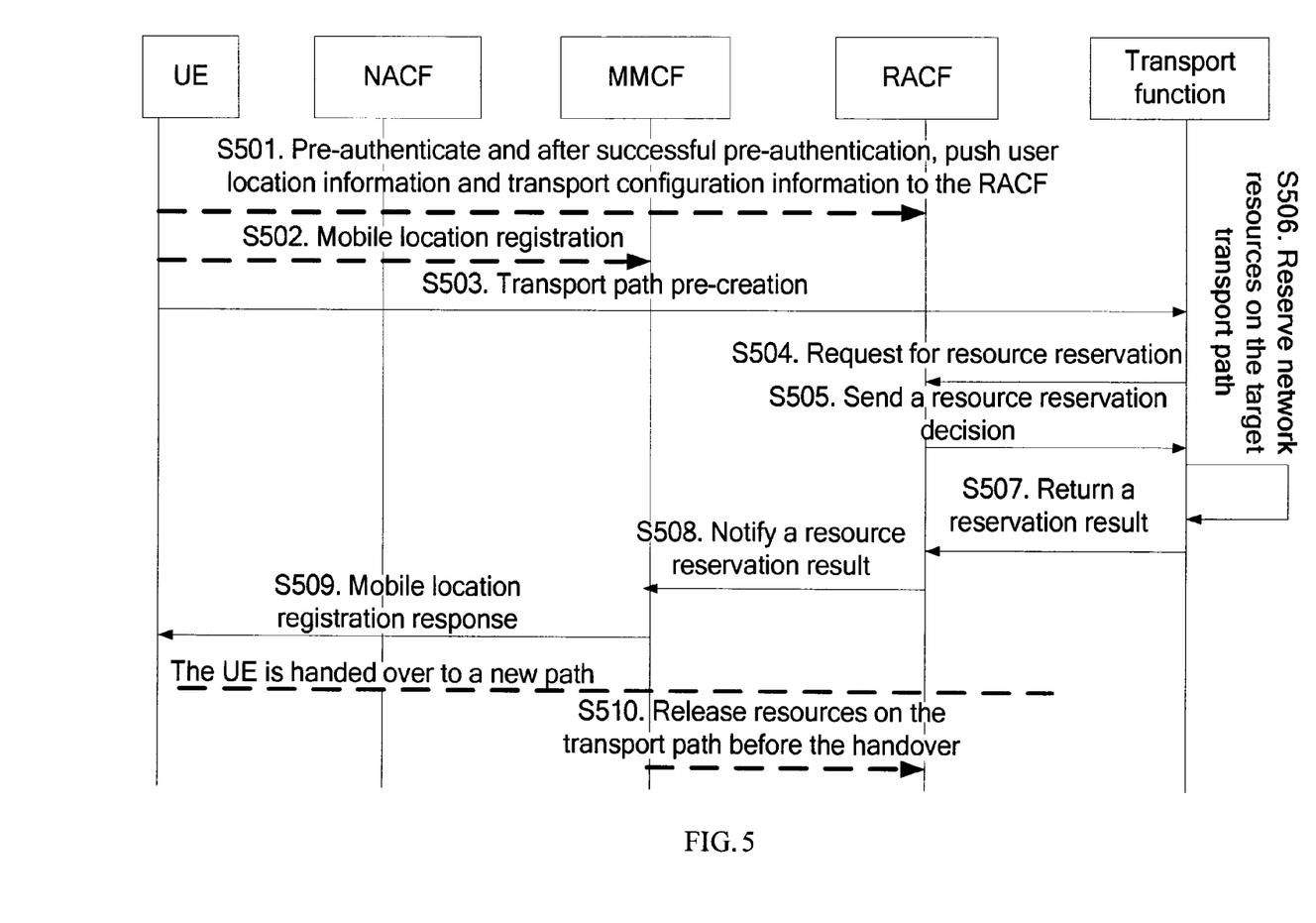
FIG. 5 is a flowchart of the method according to a second embodiment of the present invention.

According to an embodiment of the present invention, an MMCF is added at the transport stratum of the prior art and directly connected to the RACF. As shown in FIG. 5, the transport stratum includes an NACF, an RACF and an MMCF.

Before network resource reservation, the target transport path of the UE is first determined so that resources are not reserved on all candidate transport paths, thus avoiding the waste of network resources. When the UE is moving, the UE and the network check the state of the current transport path at all time, including the signal strength of the current transport path and the signal strengths of adjacent transport paths. Once the signal strength of the current transport path falls to a certain threshold, or the UE and the network reach a handover decision according to a handover policy defined by the operator, a handover preparation begins. At the handover preparation stage, if the UE detects multiple candidate transport paths or the network finds multiple candidate transport paths available for a handover of the UE through query of a topology database, a target transport path of the handover is required to be selected.

Figure 3:
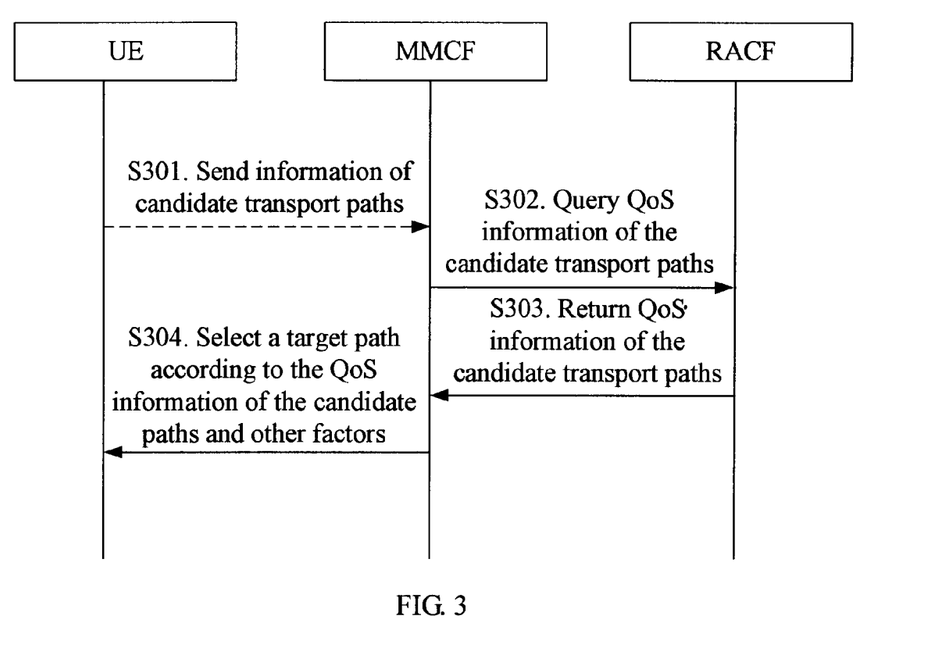
FIG. 3 is a flowchart of determining a target transport path according to a first embodiment of the present invention.

The selection process requires an entity with the function of an MMCF, that is, the function to manage and control UEs. As shown in FIG. 3, the implementation includes the following steps:

S301. The UE sends information of candidate transport paths to the MMCF. The information of a candidate transport path includes the user ID of the UE on the candidate transport path, location information of the candidate transport path, and access technology adopted by the candidate transport path, and further includes the domain name of the new access transport path if the UE moves to a new network domain.

S302. The MMCF sends a request for querying quality of service (QoS) information on the candidate transport paths. The request message carries the user ID and location information of the candidate transport paths. The QoS information mainly refers to bandwidth information on the candidate transport paths. The direct communication between the MMCF and the RACF is implemented through an external interface.

S303. The RACF queries the access and core network resource status on the transport paths identified by the location information according to the location information of candidate paths in the request from the MMCF, and returns the obtained QoS information, which is mainly bandwidth information, on the candidate paths to the MMCF.

S304. The MMCF makes a comprehensive decision according to the QoS information on the candidate transport paths and other factors and selects the target transport path. Assume there are three candidate transport paths, p1, p2 and p3. The obtained QoS information indicates that the QoS information, which is mainly bandwidth information, on p1 and p2 meets the subscription requirement of the UE. IF The UE detects that the radio signal strength connected with p1 is better that connected with p2 through scanning, p1 is finally selected; or, if the costs of access through p1 is higher than that of access through p2, in the case that the roaming policy of the user prefers a cheaper network, p2 will be selected.

After the target transport path is determined, the UE needs to perform attachment authentication (or pre-authentication) and network address configuration on the target transport path. Then the UE sends a mobile location binding update request to the MMCF. The MMCF will reserve network resources on the target transport path after receiving the mobile location binding update request.

Figure 4:
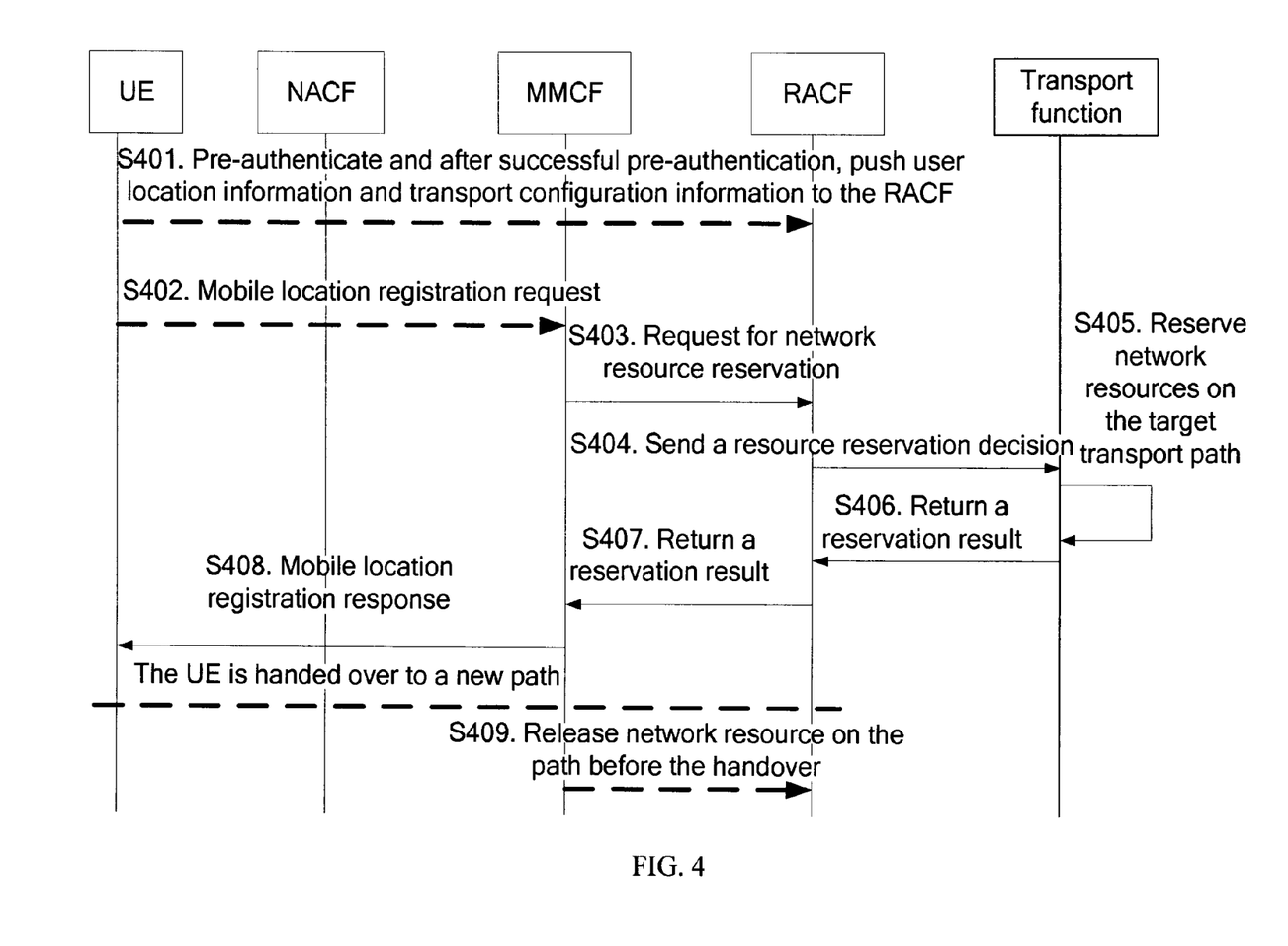
FIG. 4 is a flowchart of the method according to the first embodiment of the present invention.

Resource reservation is implemented through the transport stratum. As shown in FIG. 4, the process includes the following steps:

S401. The UE sends a pre-authentication request to the NACF. The NACF pre-authenticates whether the UE can be accessed from the target transport path. After the pre-authentication is successful, the NACF pushes the user ID of the UE on the target transport path, location information of the target transport path, and user transport configuration file of the UE to the RACF. The NACF also pushes the user ID of the UE on the target transport path and location information of the target transport path to the MMCF.

S402. In the case of host-based mobility management, the UE sends a mobile location registration request to the MMCF; in the case of network-based mobility management, the function acting as a host agent will check the mobility status of the UE and send a location registration request to the MMCF on behalf of the UE.

S403. After the pre-authentication is successful, the UE or its agent initiates a location binding update. After receiving the location update of the UE, the MMCF sends a request for resource reservation on the target transport path to the RACF. The request message carries the location information of the target transport path and the user ID of the UE. The location information of the target transport path may include the new mobile IP address assigned to the UE and access information (for example, physical access point information or logical access identity, where the physical access point information may be the name or identity of the access point device and the logical access identity may be the identity of an access port or line).

S404. After receiving the resource reservation request from the MMCF, the RACF associates the information in the request of the MMCF with the information pushed by the NACF to the RACF and queries the access and core paths and resources of the target transport path. The RACF makes a decision regarding the resource reservation request of the MMCF to determine whether to reserve network resources on the target transport path and sends the decision result to the transport function.

S405. The transport function reserves network resources, such as bandwidth, on the target transport path according to the decision result.

S406. The transport function returns the resource reservation result to the RACF.

S407. The RACF receives the network resource reservation result returned by the transport function and sends the network resource reservation result to the MMCF through the external interface.

S408. The MMCF returns a mobile location registration response to the UE. If the resource reservation is successful, the MMCF returns a mobile location registration success message; if the resource reservation fails, the MMCF returns a mobile location registration failure message.

S409. The UE keeps moving and is handed over to the target transport path. The MMCF sends a network resource release request to the RACF. The request message carries the user ID of the UE on the transport path before the handover and the location information of the transport path before the handover. The RACF releases network resources on the transport path before the handover.

A second embodiment of the present invention provides another network resource reservation method. The second embodiment differs from the first embodiment in that the MMCF obtains the network resource reservation result triggered by the transport function. In the second embodiment, an MMCF is also added at the transport stratum and connected to the RACF. In the second embodiment, a target transport path also needs to be determined first. The selection of the target transport path is the same as the process in the first embodiment and will not be described here again. As shown in FIG. 5, after the target transport path is determined, the method includes the following steps:

S501. The UE sends a pre-authentication request to the NACF. After the pre-authentication is successful, the NACF pushes the user ID of the UE, location information, and the transport configuration file of the UE to the RACF. The NACF also pushes the user ID of the UE and the location information to the MMCF.

S502. In the case of host-based mobility management, the UE sends a mobile location registration request to the MMCF; in the case of network-based mobility management, the function that acts as a host agent will check the mobility status of the UE and send a location registration request to the upper-level MMCF.

S503. After the pre-authentication is successful, the UE or its agent sends a location binding update request (that is, a mobile location registration request) to the MMCF. The UE or its agent also sends a transport path pre-creation request to the transport function. The request message carries the user ID of the UE and the location information of the target transport path. The embodiment of the present invention does not limit the sequence of S502 and S503.

S504. After receiving the request of the UE, the transport function sends a request for resource reservation on the target transport path to the RACF. The resource reservation request carries the user ID of the UE and the location information of the target transport path.

S505. The RACF associates the information in the request of the transport function with the information pushed by the NACF and determines the access and core paths and resources of the target transport path. The RACF makes a decision regarding the request of the transport function to determine whether to reserve network resources on the target transport path and sends the decision result to the transport function.

S506. The transport function reserves network resources, such as bandwidth, on the target transport path according to the decision result sent by the RACF.

S507. The transport function returns the resource reservation result to the RACF.

S508. The RACF notifies the MMCF of the resource reservation result. The notification carries the user ID of the UE and the location information of the target transport path.

S509. The MMCF returns a mobile location registration response to the UE. If the resource reservation is successful, the MMCF returns a mobile location registration success message to the UE; if the resource reservation fails, the MMCF returns a mobile location registration failure message.

S510. The UE keeps moving and is handed over to the target transport path. The MMCF sends a network resource release request to the RACF. The request message carries the user ID of the UE on the transport path before the handover and the location information of the transport path before the handover. The RACF releases network resources assigned on the transport path before the handover.

Figure 6:
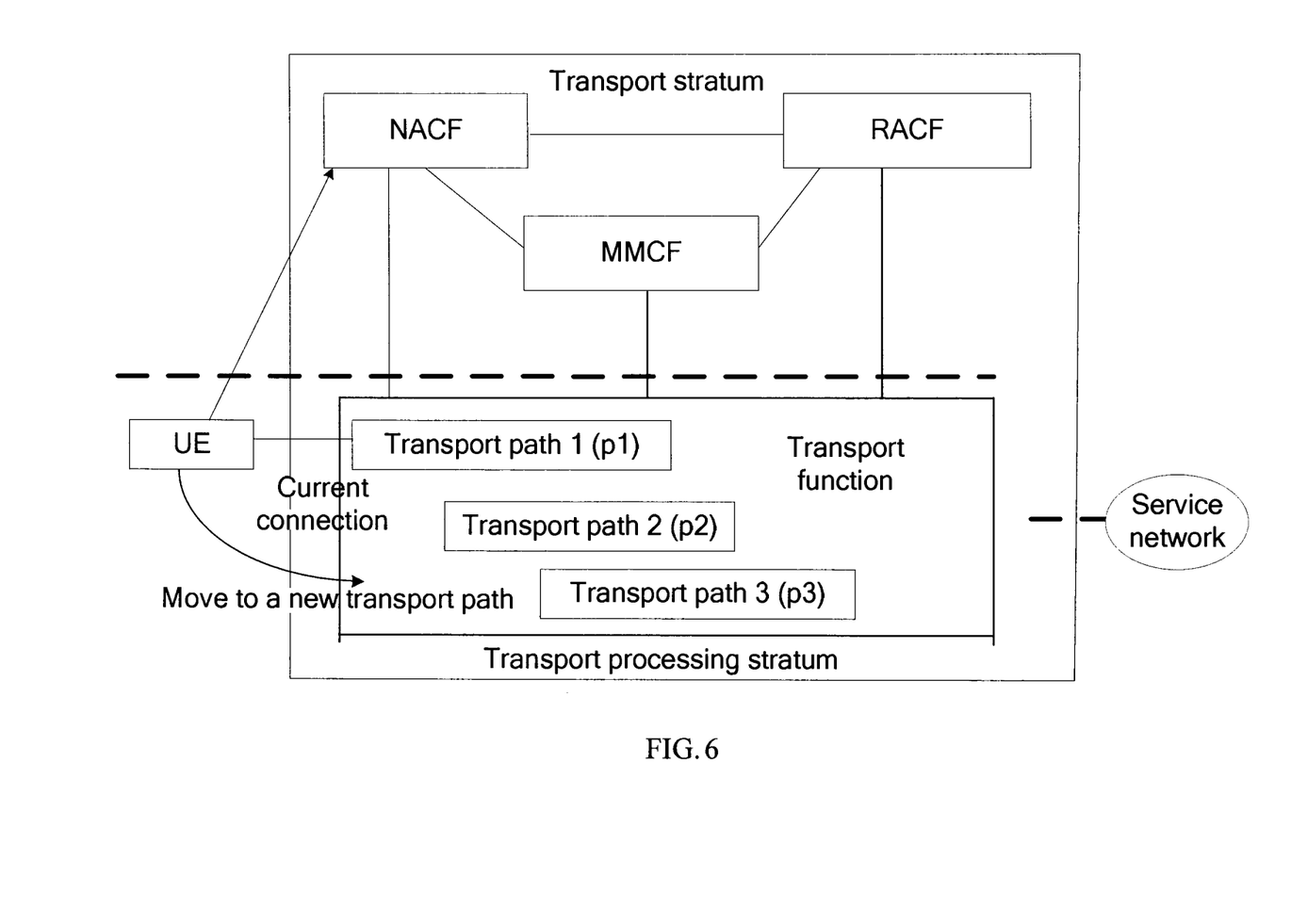
FIG. 6 is a diagram illustrating a structure of a network resource reservation system according to an embodiment of the present invention.

A third embodiment of the present invention provides a network resource reservation system. The structure of the system is illustrated in FIG. 6. The system includes an MMCF, an RACF and a transport function.

The MMCF sends a request for resource reservation on the target transport path to the RACF after receiving a location binding update request of the UE, receives the network resource reservation result returned by the RACF, and notifies the UE of the network resource reservation result. The RACF receives the resource reservation request through an external interface with the MMCF, determines whether to reserve network resources on the target transport path according to the resource reservation request of the MMCF, and controls the transport function to reserve network resources on the target transport path, and returns the network resource reservation result to the MMCF. The transport function reserves network resources on the target transport path according to the decision result.

Further, before the reservation of network resources, the NACF pre-authenticates whether the UE can be accessed from the target transport path and after the pre-authentication is successful, pushes the user ID of the UE, location information of the target transport path, and transport configuration of the UE to the RACF. The NACF also pushes the user ID of the UE and the location information of the target transport path to the MMCF. When the RACF makes a decision regarding resource reservation, the RACF makes the decision according to the user ID of the UE, location information of the target transport path, and transport configuration of the UE, and the user ID of the UE and the location information of the target transport path sent by the MMCF.

The resource reservation request on the target transport path sent from the MMCF to the NACF carries the location information of the target transport path and the user ID of the UE.

The RACF determines whether to reserve resources on the target transport path according to the resource reservation request of the MMCF, where the resource reservation request carries the user ID of the UE and the location information of the target transport path and the user ID of the UE, location information of the target transport path, and user transport configuration of the UE pushed by the NACF.

A fourth embodiment of the present invention provides another network resource reservation system. The structure of the system is illustrated in FIG. 6. The system includes an MMCF, an RACF and a transport function. The fourth embodiment differs from the third embodiment in that the reservation of network resources is implemented by the transport function.

The transport function sends a resource reservation request to the RACF according to a network access request of the UE and reserves network resources on the target transport path according to the decision result of the RACF. The RACF makes a decision according to the resource reservation request of the transport function to determine whether to reserve resources on the target transport path and controls the transport function to reserve network resources on the target transport path, and returns the resource reservation result to the MMCF. The MMCF receives the resource reservation result returned by the RACF and notifies the UE of the resource reservation result.

Further, the system includes an NACF, configured to: pre-authenticate whether the UE can be accessed from the target transport path and after the pre-authentication is successful, push the user ID of the UE, location information of the target transport path, and user transport configuration of the UE to the RACF.

The resource reservation request sent by the transport function to the RACF carries the user ID of the UE and the location information of the target transport path.

The RACF makes a decision according to the resource reservation request of the transport function, where the resource reservation request carries the user ID of the UE and the location information of the target transport path and the user ID of the UE, location information of the target transport path, and user transport configuration of the UE pushed by the NACF.

Figure 7:
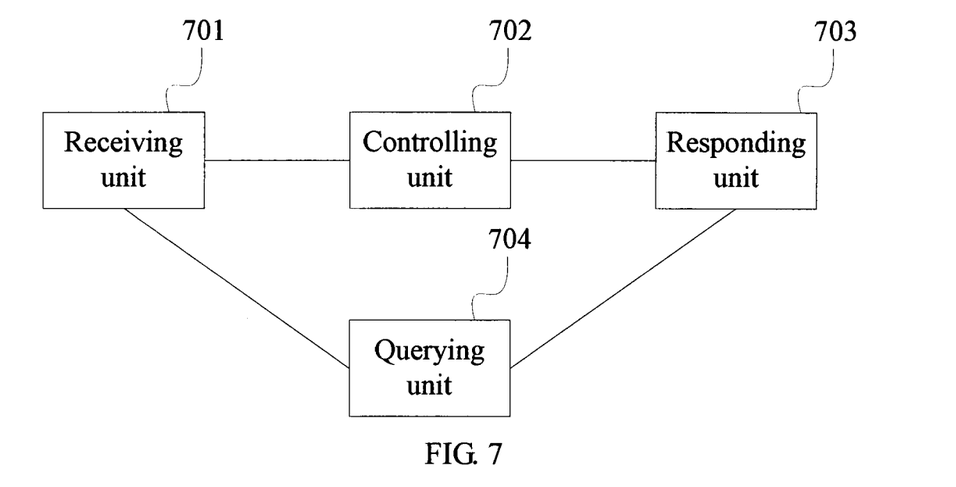
FIG. 7 is a diagram illustrating a structure of a network apparatus according to an embodiment of the present invention.

A fifth embodiment of the present invention provides a network apparatus. As shown in FIG. 7, the network apparatus includes:

a receiving unit 701, configured to directly receive, from the MMCF, a request for resource reservation on the target transport path;

a controlling unit 702, configured to control the transport function to reserve network resources on the target transport path according to the resource reservation request; and a feedback unit 703, configured to return the result of network resource reservation to the MMCF.

The receiving unit 701 and the feedback unit 703 communicate with the MMCF through an external interface.

The network apparatus further includes a querying unit 704. The querying unit 704 is configured to receive a request of the MMCF for querying QoS information of candidate transport paths, where the path QoS information request carries the location information of the candidate transport paths; query QoS information of the access section and core section of the candidate transport paths specified by the location information and return the QoS information to the MMCF so that the MMCF can determine the target transport path according to at least the QoS information of the candidate transport paths.

The specific resource reservation process is the same as the process of resource reservation in the first embodiment of the present invention and will not be described again.

The technical solution of the present invention enables the reservation of resources on the target transport path through the collaboration between an external function, such as the MMCF, and the RACF before a network handover when the UE is moving. Thus, network resources can be reserved on the target transport path in advance and if the UE keeps moving and a handover of transport path occurs, the UE can quickly and smoothly be handed over to the target transport path.

The serial number of the embodiments given above is for clear description only, and does not represent the order of preference.

Person having ordinary skill in the art may understand that all or part of the steps of the method according to the embodiments of the present invention may be implemented by a program instructing relevant hardware. The program may be stored in a computer readable storage medium. The storage medium may be a magnetic disk, a compact disk read-only memory (CD-ROM), a read-only memory (ROM) or a random access memory (RAM).

The above descriptions are merely some exemplary embodiments of the present invention, but not intended to limit the scope of the present invention. Any modification, equivalent replacement, or improvement made without departing from the spirit and principle of the present invention should fall within the scope of the present invention.

What is claimed is:

1. A method of network resource reservation for a user equipment (UE) in a centralized resource and admission control system, wherein the system comprises a transport stratum, and the transport stratum includes a resource and admission control function (RACF), a Network Attachment Control Function (NACF) and a transport function, a mobility management control function (MMCF) is added at the transport stratum to manage and control the UE, and an external interface is added in the RACF to enable direct communications between the RACF and the MMCF, so that the RACF collaborates with the MMCF to realize the method, the method comprising:

while a UE is moving in transport paths of different networks and before a network handover takes place, determining, by the MMCF, a target transport path for the UE based on quality of service (OoS) information of an access section and a core section of the target transport path;

directly receiving by the RACF, from the MMCF, a request for resource reservation on a target transport path for the UE before a network handover takes place;

controlling by the RACF, the transport function to reserve network resources in advance on the target transport path according to the resource reservation request, while retaining the network resources on a current transport path where the UE is located; and returning by the RACF, a result of the network resource reservation to the MMCF, wherein the controlling of the transport function to reserve the network resources in advance on the target transport path according to the resource reservation request, comprising:

making a decision according to the resource reservation request from the MMCF and user ID of the UE, location information of the target transport path and user transport configuration of the UE pushed by the NACF, to determine whether to reserve the network resources on the target transport path; and based on the decision result, controlling the transport function to reserve the network resources in advance on the target transport path.

2. The method of claim 1, wherein the directly receiving of the request for the resource reservation on the target transport path comprising: directly receiving the request for resource reservation on the target transport path through an external interface.

3. The method of claim 1, before the directly receiving of the request for resource reservation on the target transport path, further comprising:

receiving by the RACF, a request from the MMCF for querying QoS information of candidate transport paths, wherein the path QoS information request carries location information of the candidate transport paths; and querying by the RACF, QoS information of an access section and a core section of the candidate transport paths specified by the location information and returning the QoS information to the MMCF for the MMCF basing on the QoS information to determine the target transport path.

4. The method of claim 1, wherein the resource reservation request carries: user ID of the UE and location information of the target transport path.

5. The method of claim 1, further comprising:

notifying, by the MMCF, the UE of the resource reservation result, so that the UE keeps moving and is handed over to the target transport path;

receiving by the RACF, a request from the MMCF for releasing the network resources on the current transport path, wherein the resource release request carries user ID of the UE and location information of the current transport path; and releasing by the RACF, the network resources on the current transport path according to the resource release request.

6. A network resource reservation system in a transport stratum, comprises one or more network hardware apparatuses perform a Network Attachment Control Function (NACF), a resource and admission control function (RACF) and a transport function, wherein a mobility management control function (MMCF) is added at the transport stratum to manage and control a user equipment (UE), and an external interface is added in the RACF to enable direct communications between the RACF and the MMCF, wherein:

while a UE is moving in transport paths of different networks and before a network handover takes place, the MMCF determines a target transport path for the UE based on quality of service (OoS) information of an access section and a core section of the target transport path, sends a request for resource reservation on the target transport path to the RACF for the UE, receives a network resource reservation result returned by the RACF, and notifies the UE of the resource reservation result;

the RACF receives the resource reservation request directly through the external interface, controls the transport function to reserve network resources in advance on the target transport path while retaining the network resources on a current transport path where the UE is located, and returns the network resource reservation result to the MMCF through the external interface; and the transport function reserves the network resources according to the control of the RACF, wherein the RACF controls the transport function to reserve network resources in advance on the target transport path, comprising:

makes a decision according to the resource reservation request and user ID of the UE, location information of the target transport path and user transport configuration of the UE pushed by the NACF, to determine whether to reserve the network resources on the target transport path; and based on the decision result, controls the transport function to reserve the network resources in advance on the target transport path.

7. A computer program product for network resource reservation for a user equipment (UE) in a centralized resource and admission control system, wherein the system comprises a transport stratum, and the transport stratum includes a resource and admission control function (RACF), a Network Attachment Control Function (NACF) and a transport function, a mobility management control function (MMCF) is added at the transport stratum to manage and control the UE, and an external interface is added in the RACF to enable direct communications between the RACF and the MMCF, the computer program product comprising a non-transitory computer readable medium and computer executable instructions that, when executed by a processor, cause the RACF to perform the following:

while the UE is moving in transport paths of different networks, directly receiving from the MMCF, a request for resource reservation on a target transport path for the UE before a network handover takes place, wherein the target transport path is determined by the MMCF based on quality of service (OoS) information of an access section and a core section of the target transport path;

controlling the transport function to reserve network resources in advance on the target transport path according to the resource reservation request, while retaining the network resources on a current transport path where the UE is located; and returning a result of the network resource reservation to the MMCF, wherein the RACF controls the transport function to reserve network resources in advance on the target transport path, comprising:

makes a decision according to the resource reservation request and user ID of the UE, location information of the target transport path and user transport configuration of the UE pushed by the NACF, to determine whether to reserve the network resources on the target transport path; and based on the decision result, controls the transport function to reserve the network resources in advance on the target transport path.

* * * * *